United States Patent [19]

Stewart

[11] 4,341,465
[45] Jul. 27, 1982

[54] EXPOSURE CONTROL FOR SUBTRACTIVE PHOTOGRAPHIC PRINTER

[75] Inventor: James F. Stewart, Shoreview, Minn.

[73] Assignee: Pako Corporation, Minneapolis, Minn.

[21] Appl. No.: 186,189

[22] Filed: Sep. 11, 1980

[51] Int. Cl.³ .................. G03B 27/72; G03B 27/76
[52] U.S. Cl. ........................................ 355/36; 355/88
[58] Field of Search ............... 355/32, 36, 77, 88, 355/35

[56] References Cited

U.S. PATENT DOCUMENTS 2,997,389 8/1961 Boon ..................................... 355/35
3,661,458 5/1972 Noemer et al. .................. 355/36 X Primary Examiner—Richard A. Wintercorn
Attorney, Agent, or Firm—Kinney, Lange, Braddock, Westman and Fairbairn

[57] ABSTRACT

A subtractive photographic printer is capable of providing extremely short exposure time by coordinating the operation of a shutter and color filters. The shutter is normally positioned in the light path, and is driven out of the light path at the beginning of an exposure cycle. The exposure in each color channel is terminated by driving the color filter associated with that color channel into the light path in a direction which is essentially the same as the direction in which the shutter was driven out of the light path. In addition, the filter is driven into the light path at essentially the same rate at which the shutter was driven out of the path. The exposure time for the color channel is determined by the time delay between actuation of the shutter drive and actuation of the filter drive, since the shutter and the filter move in the same direction and at essentially the same rate. It is possible, therefore, to achieve exposure times which are shorter than the time required to drive the shutter out of the light path or the filter into the light path, since the exposure time is determined by the time delay between actuation of the shutter drive and the filter drive, rather than the response times of the shutter and filter drive.

4 Claims, 8 Drawing Figures

EXPOSURE CONTROL FOR SUBTRACTIVE PHOTOGRAPHIC PRINTER

BACKGROUND OF THE INVENTION

1. Field of the Invention

The present invention relates to photographic printers. In particular, the present invention is related to apparatus for controlling exposure times in a subtractive type photographic printer.

2. Description of the Prior Art

Photographic printers produce color or black-and-white prints or transparencies from photographic film originals (generally negatives). High intensity light is passed through the film and imaged on the photosensitive print medium. The photographic emulsion layers on the print medium are exposed and subsequently processed to produce a print of the image contained in the original.

Nearly all photographic printers used commercially today are "subtractive" type printers. A subtractive printer typically includes a source of white light, a shutter, and cyan, magenta and yellow color filters to terminate exposure in the red, green and blue color channels, respectively. When the shutter is opened, white light is permitted to pass through the negatives and is imaged on the photosensitive medium. When the exposure in the red color channel is completed, the cyan filter is driven into the light path, so as to subtract the red component of the light. Similarly, the magenta filter is driven into the light path to terminate a green exposure, and the yellow filter is driven into the light path to terminate the blue exposure.

In order to increase efficiency and minimize the time required to fill customer orders, there has been continuing efforts to increase the speed of photographic printers. One technique which has been used to increase the speed of photographic printers has been to increase the intensity of the light used in printing (and thus decrease exposure times). Since the exposure of the print medium is a function of light intensity and exposure time, in general the exposure time can be reduced by increasing intensity, while still yielding the same exposure.

While the increase in intensity of the light used for printing has in general resulted in higher speed operation of photographic printers, there are problems which have been encountered. In particular, highly underexposed negatives have a density which is very low, and the exposure time required to produce the desired exposure is very short. As the light intensity is increased, the exposure time required for proper printing becomes extremely short. Since solenoids are typically used to drive the shutter out of the light path and the color filters into the light path, the minimum exposure time in prior art photographic printers has been limited by the response time of the shutter and filter drive solenoids. The increase in print light intensity has been limited, therefore, by this minimum exposure time.

In the past, attempts have been made to overcome the problem of underexposed negatives having exposure times less than the minimum exposure time. One technique which has been used is known as "dual intensity printing". In this technique, most negatives use the normal high intensity light. For underexposed negatives which would have an exposure time falling below the minimum exposure time if the normal high intensity light is used, the light intensity is reduced to a lower intensity by introducing a neutral density paddle in the light path. This increases the exposure time to above the minimum exposure time.

The dual intensity printing technique, however, adds complexity to the printer. It requires an additional neutral density paddle having a design which will not affect the intensity distribution of the light and yet will decrease the intensity to a desired level. In addition, a solenoid or other drive apparatus must be provided to control the position of the neutral density paddle. The exposure control of the printer must also be modified to identify those negatives having an exposure time less than the minimum exposure time and to actuate the neutral density paddle solenoid when printing those identified negatives.

SUMMARY OF THE INVENTION

The present invention is based upon the recognition that, with the proper coordination of the direction and rate of travel of the shutter and color filters in a subtractive photographic printer, exposure times can be achieved which are essentially independent of the response times of the shutter and filter drives. In the present invention, the shutter is driven from a position blocking the light path to a position out of the light path to initiate an exposure. Each color filter is driven into the light path in essentially the same direction and at essentially the same rate that the shutter paddle was driven out of the light path. As a result, the exposure time for each color channel is essentially equal to the time delay between actuation of the shutter drive and actuation of the color filter drive for that color channel. The exposure time is essentially independent of the time required to drive the solenoid out of the light path and the time required to drive the filter into the light path, since both the shutter and the filter are driven in essentially the same direction and at essentially the same rate.

DETAILED DESCRIPTION OF THE PREFERRED EMBODIMENTS

Figure 1:
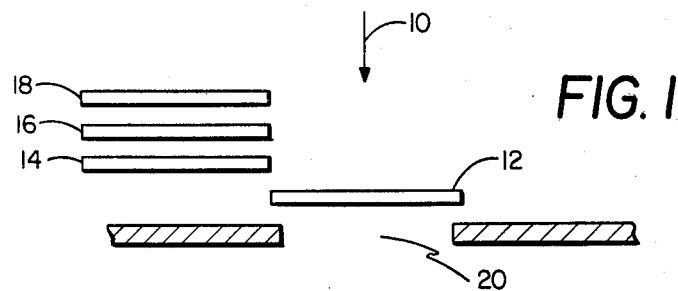
FIGS. 1 through 5 schematically illustrate the operation of a shutter and color filters in a subtractive photographic printer utilizing the exposure control of the present invention.

FIGS. 1 through 5 illustrate schematically the operation of the exposure control of the present invention in a subtractive type photographic printer. In FIGS. 1 through 5, light from a light source (not shown) is directed along a light path as illustrated by arrow 10.

The exposure control illustrated in FIGS. 1 through 5 includes shutter 12, cyan filter 14, magenta filter 16, and yellow filter 18. Also illustrated is aperture 20, through which the light passes on its way from the light source to the image area of a photosensitive medium (not shown) such as photographic print paper.

FIG. 1 illustrates the position of shutter 12 and filters 14, 16 and 18 prior to commencement of an exposure. Shutter 12 is positioned in the light path, and blocks light from passing through aperture 20. Filters 14, 16 and 18 are positioned at least partially out of the light path, and in the particular embodiment shown in FIG. 1, filters 14, 16 and 18 are totally out of the light path.

Figure 2:
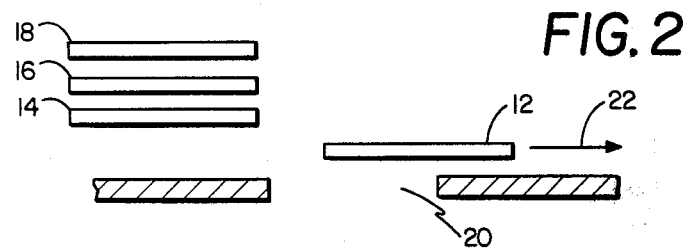

In FIG. 2, the exposure cycle has been commenced. Shutter 12 has begun to move from its normal position illustrated in FIG. 2 to a position out of the light path. The direction of movement of shutter 12 is illustrated by arrow 22.

In the exposure control system of the present invention, the operation of shutter 12 and filters 14, 16 and 18 is coordinated so that each of the filters is driven into the light path in essentially the same direction and at essentially the same rate that shutter 12 is driven out of the light path. As a result, the exposure time for a particular color channel is determined by the delay time between the beginning of movement of shutter 12 out of the light path and the beginning of movement of filter 14, 16 or 18 into the light path. By coordinating the direction and rates of movement of the shutter and the filters, the exposure times for each of the color channels are essentially independent of the rate of movement of the shutter and filters. As a result, exposure times are possible which are shorter than the time required to move shutter 12 out of the light path or the time required to move filter 14, 16 or 18 into the light path.

In the example illustrated in FIGS. 1 through 5, cyan filter 14 is shown as being moved into the light path, thus terminating the red exposure. For simplicity, movement of magenta filter 16 and yellow filter 18 is not illustrated. It is understood, of course, that operation of filters 16 and 18 in controlling green and blue exposure times is similar to the operation of cyan filter 14 in controlling red exposure times.

Figure 3:
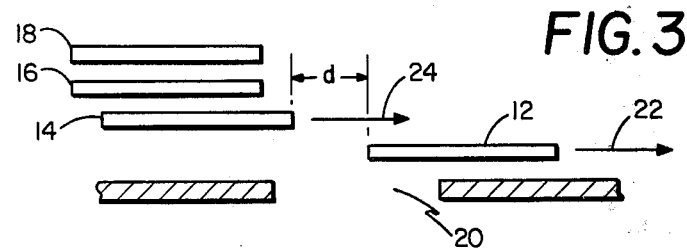

As illustrated in FIG. 3, cyan filter 14 has begun to move into the light path in the direction illustrated by arrow 24. The direction of movement of cyan filter 14 into the light path is essentially the same direction as the direction of movement of shutter 12 out of the light path as illustrated by arrow 22. Movement of cyan filter 14 commenced after a time delay following the commencement of movement of shutter 12. Since filter 14 is moving in generally the same direction and at generally the same rate as shutter 12, it trails shutter 12 by a distance "d" illustrated in FIG. 3.

Figure 4:
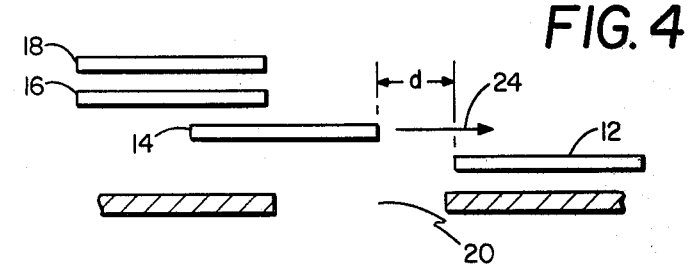

As shown in FIG. 4, shutter 12 has just reached its final position out of the light path, and cyan filter 14 is continuing to move into the light path in the direction illustrated by arrow 24. The distance "d" remains essentially constant, as illustrated by FIGS. 3 and 4, as long as both shutter 12 and cyan filter 14 are moving.

Figure 5:
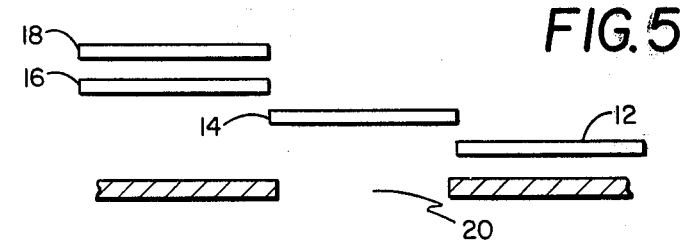

FIG. 5 illustrates the final position of cyan filter 14 at the end of the red exposure. Cyan filter 14 reaches its final position in the light path (illustrated in FIG. 5) at a time delay equal to the red exposure time after shutter 12 reached its final position out of the light path.

As a result of the coordination of the direction and rate of movement of shutter 12 and cyan filter 14, the effective red exposure time is equal to the time delay between actuation of shutter 12 and actuation of filter 14. The red light is in effect scanned across the image area.

The schematic illustration of the present invention shown in FIGS. 1 through 5 shows shutter 12 and filters 14, 16 and 18 closely spaced from one another. There is some advantage, however, to separating the filters and the shutter, with the filters positioned in the light path between the light source and the negative, and the shutter positioned in the light path between the negative and the photosensitive medium. The exposure control of the present invention is equally applicable to an arrangement in which the filters and shutter are located at different positions in the light path.

Shutter 12 is driven by rotary shutter drive solenoid 30 through arm 32. Shutter drive solenoid 30 is spring biased in its unactuated state in a counterclockwise direction, so that an edge of shutter 12 engages stop 34, which includes bracket 34a and resilient pad 34b. When actuated, solenoid 30 rotates arm 32 in a clockwise direction to drive shutter 12 out of the light path to a position shown in FIG. 8, in which an edge of shutter 12 engages resilient stop pad 36 mounted on a wall of housing 28.

Figure 6:
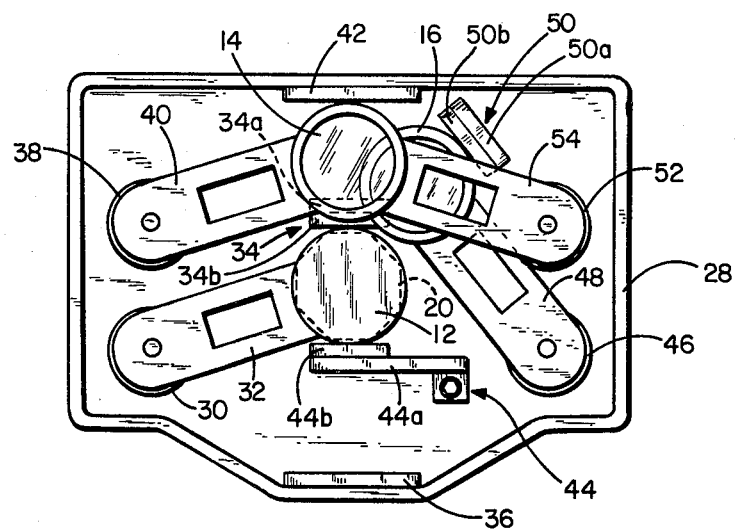
FIGS. 6 through 8 are top views illustrating operation of a shutter and filter drive system utilizing the present invention.
Figure 7:
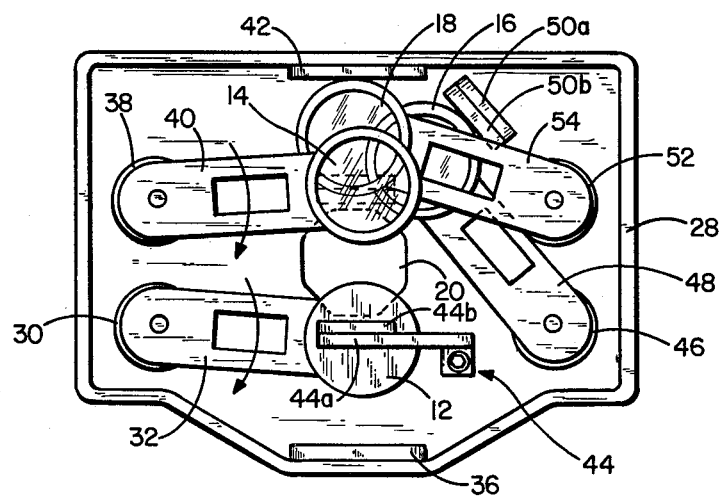
Figure 8:
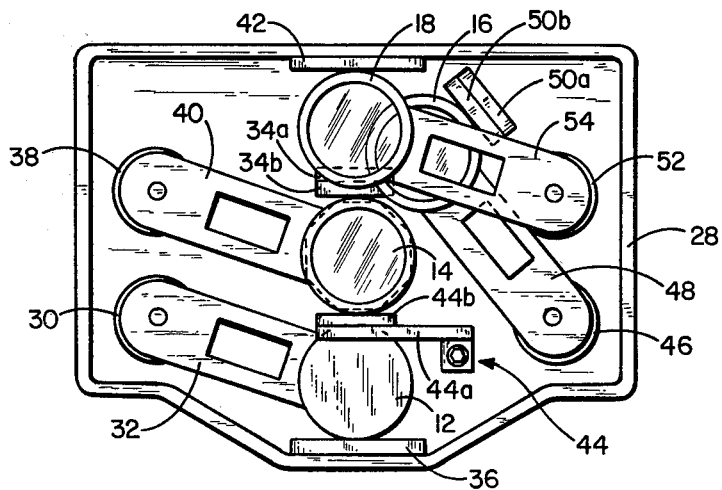

Cyan filter 14 is driven by solenoid 38 through arm 40. A spring bias of solenoid 38 maintains cyan filter 14 in its normal position in engagement with resilient stop 42 mounted on a wall of housing 28. When actuated, solenoid 38 rotates arm 40 in a clockwise direction to drive cyan filter 14 into the light path as illustrated in FIGS. 6 and 7. The final position of cyan filter 14 in the light path is illustrated in FIG. 8. In this position, cyan filter 14 has an edge which engages stop 44 formed by bracket 44a and resilient pad 44b.

Solenoid 46 controls magenta filter 16 through arm 48. Since solenoid 46 is positioned on the opposite side of aperture 20 from solenoids 30 and 38, it is normally spring biased in a clockwise direction to hold magenta filter 16 in engagement with stop 50 formed by bracket 50a and resilient pad 50b. When actuated, solenoid 46 rotates arm 48 in a counterclockwise direction into the light path until magenta filter 16 engages resilient pad 44b.

Similarly, solenoid 52 controls the position of yellow filter 18 through arm 54. Solenoid 52 is normally spring biased in a clockwise direction to hold yellow filter 18 in its normal position in engagement with resilient stop 42. When actuated, solenoid 52 rotates arm 54 in a counterclockwise direction to drive yellow filter 18 into the light path until it engages resilient pad 44.

As illustrated in FIGS. 6 through 8, shutter 20 is located below filters 14, 16 and 18, and moves under bracket 44a and resilient stop 44b as it is driven out of the light path. Filters 14, 16 and 18 are all positioned at a higher elevation, so that they engage resilient stop 44b as they are driven into the light path.

In FIGS. 6 through 8, each of the filters 14, 16 and 18 is driven into the light path in essentially the same direction and at essentially the same rate as the shutter 12 is driven out of the light path. As a result, the red exposure time is essentially equal to the time delay between actuation of the shutter solenoid 30 and cyan filter solenoid 38. Similarly, the green exposure time is essentially equal to the time delay between actuation of shutter solenoid 30 and actuation of magenta filter solenoid 46. The blue exposure time is essentially equal to the delay time between actuation of shutter solenoid 30 and actuation of yellow filter solenoid 52. The exposure times are independent of the drive times of solenoids 30, 38, 46 and 52. Thus the exposure time for particular color channels can be less than the time required by solenoid 30 to drive shutter 12 out of the light path or the time required by solenoid 38, 46 or 52 to drive the filter into the light path.

The exposure control of the present invention, therefore, permits substantially shorter exposure times than has been possible in the prior art photographic printers. Unlike the prior art dual intensity printing technique, the exposure control of the present invention eliminates problems with extremely underexposed negatives without requiring additional components and without significantly increasing the complexity of the printer. In the present invention, the operation of the shutter and the filters is coordinated in order to eliminate limitations in exposure times caused by the response time of the drive solenoids for the shutter and the filters. The exposure control of the present invention does not require introduction of an additional element into the optical path which can degrade or alter the light distribution. This is a significant disadvantage of the dual intensity printing technique.

In conclusion, the present invention is an improved exposure control which permits extremely short exposure times without requiring additional components, and without increasing the complexity of the printer. Although the present invention has been described with reference to preferred embodiments, workers skilled in the art will recognize that changes may be made in form and detail without departing from the spirit and scope of the invention.

What is claimed is:

1. A subtractive photographic printer comprising:
   means for providing light along a light path;
   a shutter normally positioned in the light path;
   shutter drive means for driving the shutter in a first direction from its normal position in the light path to a position out of the light path;
   a cyan filter for terminating red exposure when positioned in the light path;
   cyan filter drive means for driving the cyan filter in essentially the first direction into the light path to terminate red exposure;
   a magenta filter for terminating green exposure when positioned in the light path;
   magenta filter drive means for driving the magenta filter in essentially the first direction into the light path to terminate green exposure;
   a yellow filter for terminating blue exposure when positioned in the light path;
   yellow filter drive means for driving the yellow filter in essentially the first direction into the light path to terminate blue exposure; and
   exposure control means for controlling red, green and blue exposure times by actuating the shutter drive means to drive the shutter to a position out of the light path and, after time delays essentially corresponding to desired red, green and blue exposure times, actuating the cyan, magenta and yellow filter drive means, respectively, to drive the cyan, magenta and yellow filters into the light path at essentially the same rate at which the shutter was driven to a position out of the light path, so that the exposure time is essentially a function of the time delay and essentially not dependent upon the rate at which the shutter is driven.

2. A subtractive photographic printer comprising:
   means for providing light along a light path;
   a shutter normally positioned in the light path;
   a color filter for terminating exposure in a selected color channel when positioned in the light path;
   shutter drive means for driving the shutter in a first direction from its normal position to a position out of the light path;
   filter drive means for driving the color filter in essentially the first direction into the light path to terminate exposure in the selected color channel; and
   exposure control means for controlling exposure time for the selected color channel by actuating the shutter drive means to drive the shutter to the position out of the light path and, after a time delay essentially corresponding to a desired exposure time for the selected color channel, actuating the filter drive means to drive the color filter into the light path at essentially the same rate at which the shutter was driven to a position out of the light path, so that the exposure time is essentially a function of the time delay and essentially not dependent upon the rate at which the shutter is driven.

3. The subtractive photographic printer of claim 2 wherein the shutter drive means comprises:
   a shutter drive solenoid; and
   a shutter drive arm connected to the shutter drive solenoid for driving the shutter when the shutter drive solenoid is actuated.

4. The subtractive photographic printer of claim 3 wherein the shutter drive solenoid is a rotary solenoid.

* * * * *